J. B. FOOTE AND C. T. STRITE.
GEARING FOR TRACTORS.
APPLICATION FILED SEPT. 28, 1916.

1,433,994.

Patented Oct. 31, 1922.
7 SHEETS—SHEET 1.

J. B. FOOTE AND G. T. STRITE.
GEARING FOR TRACTORS.
APPLICATION FILED SEPT. 28, 1916.

1,433,994.

Patented Oct. 31, 1922.

Witnesses:

Inventors
John B. Foote and George T. Strite
By Fred Gerlach
Their Attys.

Patented Oct. 31, 1922.

1,433,994

UNITED STATES PATENT OFFICE.

JOHN B. FOOTE, OF OAK PARK, ILLINOIS, AND GEORGE T. STRITE, OF MINNEAPOLIS, MINNESOTA, ASSIGNORS TO FOOTE BROS. GEAR & MACHINE CO., OF CHICAGO, ILLINOIS, A CORPORATION OF ILLINOIS.

GEARING FOR TRACTORS.

Application filed September 23, 1916. Serial No. 122,594.

*To all whom it may concern:*

Be it known that we, JOHN B. FOOTE and GEORGE T. STRITE, citizens of the United States, and residents of Oak Park, county of Cook, and State of Illinois, and Minneapolis, county of Hennepin, State of Minnesota, respectively, have invented new and useful Improvements in Gearing for Tractors, of which the following is a full, clear, and exact description.

The invention relates to variable speed transmission gearing for tractors. Gearing for tractors usually comprises mechanism for driving the traction wheels at two speeds forward and one reverse speed and differential gearing for permitting the traction wheels to rotate at different relative speeds. In practice, the engines on different tractors are differently located. In some instances, the motor-shaft is disposed longitudinally of the tractor frame and in other instances, transversely thereto. Resultantly, it has usually been necessary heretofore to specially design gearing for every different tractor. Furthermore, in tractors of different sizes, different ratios of speed are desired and usually it has been necessary to specially design the gearing as an entity for the particular ratio desired.

One object of the present invention is to provide improved transmission gearing which is adapted to be applied to these different tractors without substantial reorganization or change of design, and which is adapted for different sizes of gears for different speed ratios without material reorganization. In other words, to provide gearing for tractors which is generally adapted for application to tractors which are differently constructed, and in which different ratios of gearing are desired, without substantial reorganization.

In some instances, the traction wheels have fixed thereon, internal gears and in others external gears are employed, and in such cases the differential shafts must be driven in different directions according to whether the gears on the traction-wheels are internally or externally toothed. The disposition of the motor at one side or another of the gearing results in driving the gearing in different directions.

Another object of the invention is to provide gearing which can be reversed in the case to meet these different conditions so that it will be applicable to different tractors without substantial change of structure.

A further object of the invention is to provide a combined transmission gearing and differential gearing which is adapted for use on tractors.

A further object of the invention is to provide improved controlling mechanism for variable speed and reversible transmission gearing.

Other objects of the invention will appear from the following description.

The invention consists in the several novel features hereinafter set forth and more particularly defined by claims at the conclusion hereof.

In the drawings: Fig. 1ª is a similar view showing the invention applied to a side connection with a motor and in which the motor shaft extends transversely on the tractor. Fig. 2ª is a similar view of the gearing with a side-connection for a motor. Fig. 3ª is a section taken on line 3ª—3ª of Fig. 3. Fig. 4ª is a section taken on line 4ª—4ª of Fig. 4. Fig. 5ª is a detail of the locking plate for the controller mechanism. Fig. 5ᵇ is a section taken on line 5ᵇ—5ᵇ of Fig. 3ª. Figs. 5ᶜ, 5ᵈ and 5ᵉ are details of the controller arms for the low, high and reverse pinions, respectively. Fig. 5ᶠ is a section of the spring pin for holding the shifter arm in assigned position. Fig. 6ª is a view showing a similar reversal with a side-connection for the motor. Fig. 7ª is a section of the same. Fig. 7ᵇ is a plan of the same. Fig. 7ᶜ is a section showing the gearing equipped for an additional speed-reduction between the intermediate gear and the drive-gear of the differential.

The variable speed gearing and the differential gearing are all enclosed within a case $a$ which is adapted to retain lubricant for gearing. A drive-shaft $b$ is mounted in and near one end of the case and the differential gearing $c$ is mounted in and near the other end of the case. The end of case $a$ containing the differential gearing is supported by sleeves 15 and 16, each provided with a flange or head 17 which is secured to one side of the case by bolts 18, each side being recessed as at 19 to receive one of the heads. At its inner end, each of the sleeves 15 and 16 is provided with a bearing 20 and at its outer end with a roller bearing 21. The outer ends of the sleeves 15 and 16 are suitably secured to or supported on the supporting frame of the tractor in any suitable manner, as well understood in the art.

Driven shafts $c'$ are mounted in sleeves 15 and 16 respectively and the outer end of each of these shafts has affixed thereto a pinion 24 adapted to mesh with the gear on one of the traction wheels, or a wheel for otherwise driving a traction-wheel, as well understood in the art. The differential gearing $c$ for the driven shafts $c'$ comprises a drum 25 formed with an integral flange 26 for attachment of a gear ring 27 by which the differential gearing will be driven. Drum 25 comprises flanged sides 28, each of which has a hub 29 journalled in one of the bearings 20 of the sleeves 15, 16. Bolts 30 secure the members of the drum 25 together. Arbors 31 are mounted in drum 25 and a ring 32. Bevelled pinions 33 on arbors 31 mesh with the bevelled gears $c^2$ on shafts $c'$ respectively. The rear portion of the case $a$ is provided with an opening $a'$ through which the gear-ring 27 and other parts, if desired, may be placed into and removed from the case and this opening is closed by the cover $a^{10}$. Openings $a^2$ formed in the sides of the case $a$, are of sufficient diameter to permit the drum to be inserted laterally into the case. Drive shaft $b$ is parallel to the driven shafts $c'$ and is journalled in roller-bearings 35 and 36. Bearing 35 is carried in a head 37 which is removably secured to one side of the case $a$ by bolts 37' and bearing 36 is carried by a head 38 which is removably secured to the other side of the case $a$ by bolts 39. This shaft extends laterally to one side of the gear case, as at $b'$ and is provided with a service pulley 40 for driving any mechanism other than the traction wheels of the tractor. A shaft 41 coaxial with or a part of the motor shaft is mounted in a roller bearing 42 held in one end of the case $a$. A thrust bearing 43 is provided between the bearing 42 and a cap 44. Said cap contains packing 45 for excluding dust from the bearings for shaft 41 and the case $a$. A bevelled pinion 46 fixed to the inner end of the drive shaft 41, meshes with a bevelled gear 47 which is fixed to the drive-shaft $b$ adjacent bearing 36. Gears 46 and 47 serve to impart movement to said drive shaft, usually through a suitable clutch 48 driven by the motor. A high speed pinion 49 and a low speed pinion 50 are slidably mounted and separably movable on the drive-shaft $b$, being connected thereto by a key 51 in such manner as to cause both pinions to be driven in all positions on the shaft. Integral intermediate gears 52 and 53 are mounted in the case between drive-shaft $b$ and the differential gearing. These intermediate gears are mounted on a stud shaft 54 in the case $a$. Said stud shaft is parallel with the drive-shaft $b$ and is held in the sides of the case $a$ by a key 55 which also secures a spacing sleeve 56 against rotation in the case. Shaft 54 is held in holes 54' drilled in the sides of the case. In assembling, the sleeve 56 and the double gear thereon are slipped into the case when cover $a^{10}$ is removed and the stud shaft 54 is then inserted endwise through the holes in the sides of the case $a$.

It is desirable to provide a construction which is adapted for different ratios of speed without an essentially different organization or design and by the use of gears of the sizes necessary to drive the driven shafts at the desired ratio. By drilling the holes 54' for the stud shaft 54 different distances from the axis of the shaft 34, different ratios of speed may be attained, it being understood that the sizes of pinions 49, 50, intermediate gear 52 and 53 and gear-ring 27 will be correspondingly varied. This feature adapts the gearing for different ratios of speed without structural change in the case and by mere proper placement of the holes for supporting the shaft 54.

High speed pinion 49 is movable laterally on shaft $b$ into engagement with the high speed gear 52 of the double intermediate gear. Low speed pinion 50 is movable laterally on shaft $b$, into and out of engagement with the gear 53. Gear 52 meshes constantly with the gear ring 27 which is removably connected to the differential gear drum 25. In using gears of different sizes to provide for the desired ratio of speed of the differential shafts, it is sometimes necessary to use gears 27 of different sizes and by providing a removable gear-ring on the drum 25, this ratio may be attained with a standard drum and gearing between the drum and the differential shafts. This separate gear-ring 27 may be secured to one side of flange 26 and of a size to engage the small intermediate gear as shown in full lines of Fig. 2, or may be secured to the other side of flange 26 and of a size to engage the large intermediate gear as shown in dotted lines of Fig. 2. In this manner, provision is made for variation of speed ratios to adapt the gearing for different tractors. When the gears 49, 50 are in neutral position, shown in Fig. 1, the intermediate gears 52 and 53 are idle so that there will be no wear upon these gears resulting from running when the differential gearing is idle.

A shaft 60, which is parallel to the driveshaft $b$, is suitably held in the sides of the case $a$ and integral reverse pinions 61 and 62 are slidable on the shaft 60. Pinion 61 is adapted to mesh with the gear 52 of the intermediate gear and gear 62 is adapted to be shifted into mesh with the high speed pinion 49. Normally, the reverse pinions 61 and 62 are idle and when they are shifted laterally, gear 62 will pass into engagement with the constantly rotating high speed pinion 49 and pinion 61 will pass into engagement with the gear 52. The movement to render the reverse gearing operative is less than the width of either of said pinions and the clearance between the high speed pinion 49 and reverse pinion 62 is less than between the intermediate gear 52 and pinion 61 and the purpose of this is to cause gears 62 and 61 which are normally idle to commence rotation before the pinion 61 engages the intermediate gear 52 so that they can be slipped into engagement even though the teeth of pinion 50 and gear 52 were stopped where they would not slide into interfitting relation. This reversible gearing exemplifies a construction in which the reverse pinions and the intermediate gears driven by them are all normally idle and in which provision is made for rotating the reverse pinions initially to engage the intermediate gear. Cross walls $a^7$ and $a^8$ are formed on the bottom of case $a$ to hold lubricant where the intermediate gears will dip into it, and so that the gears on shaft $b$ will also be lubricated. A drain plug $a^9$ is provided in the bottom of the case $a$.

Figure 3:
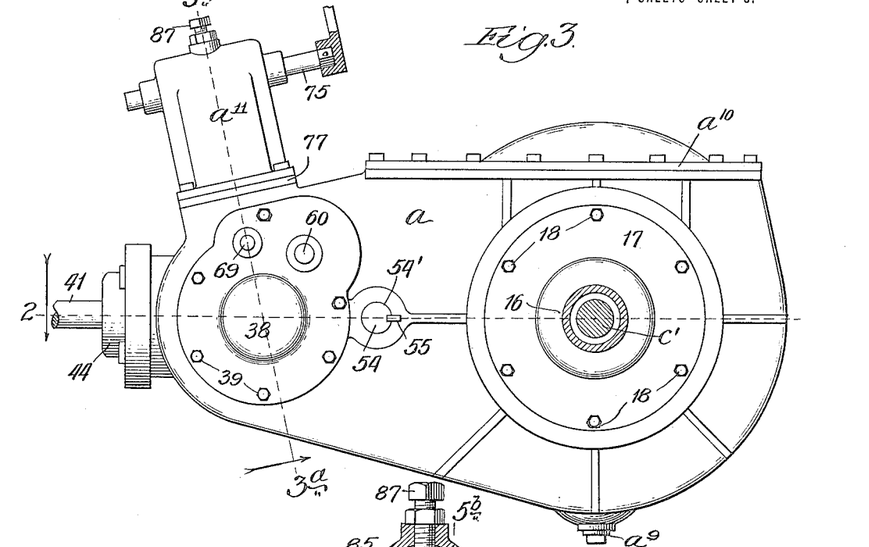
Fig. 3 is a side elevation of the form of the invention illustrated in Fig. 2.
Figure 3A:
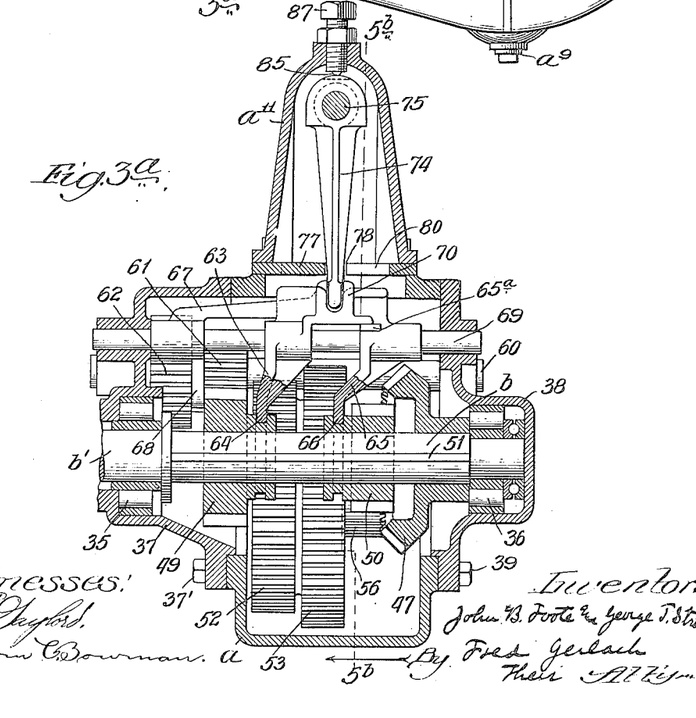

The mechanism for controlling the transmission gearing comprises an arm 63 provided with a fork 64 fitting into a groove in the hub of high speed pinion 49 (Figs. 3$^a$, 5, and 5$^d$); an arm 65 provided with a fork 66 fitting in a groove in the hub of the low speed pinion 50 (Figs. 3$^a$, 5, and 5$^c$) and arm 67 (Figs. 3$^a$, 5, and 5$^e$) provided with a fork 68 fitting between integral pinions 61, 62. All of these arms 63, 65 and 67 have hubs which are slidable on a shaft 69 which is mounted in the sides of the case $a$. Arms 63, 65 and 67 are formed respectively with grooved lugs 70, 71 and 72 which are relatively offset or disposed laterally of one another so anyone may be shifted longitudinally of shaft 69 independently of the other. Controller arm 65 (Fig. 5$^c$) is formed with lugs 65$^a$ for sliding engagement with flat surfaces on the underside of arms 63 and 67 for mutual guidance. Normally, or when the gearing is in neutral position, the lugs 70, 71 and 72 are aligned so that a shifter arm 74 may be shifted laterally into any of the grooved lugs. Arm 74 is secured to a slidable rock-shaft 75 which is mounted in a housing $a^{11}$ secured on the case $a$. Shaft 75 is slidable in the housing $a^{11}$ so that the lower end of arm 74 is adapted to extend into either of the grooved lugs 70, 71 and 72 and may be shifted to bring said end into operative or interfitting relation with either of the lugs and shaft 75 may be rocked by suitable means to rock arm 74 to shift either of the lugs 70, 71, 72 longitudinally of shaft 69 to render the high speed, the low speed or the reverse operative. A slotted plate 77 is secured between the casing $a$ and housing $a^{11}$ and the lower end of arm 74 extends through the slot in this plate. This slot is formed to control the movement of the arm 74 so that it can be rocked only when it is in correct position to shift one of the controller arms. For this purpose, plate 77 has a cross slot 78 formed therein for bodily shift of the arm, a communicating slot 79 extending from one side of the cross slot to permit arm 74 to be rocked to operate the low speed arm 65, a slot 80 communicating with the cross slot and disposed to permit arm 74 to be rocked when it is in position to operate the high speed controller arm 63, and a slot 81 communicating with the cross slot and disposed to permit arm 74 to be rocked when it is in the correct position to operate the reverse controller arm 67. This necessitates the shift of the lever 74 to its centralized position, and shift of all the pinions to neutral positions before arm 74 can be shifted from one controller arm to either of the others. A double arm 82 is mounted on the slidable rocking controller shaft 75 and the depending members 83 have their terminals formed to slide in the cross slot 78 in the plate 77 and the grooves on the lugs 70, 71 and 72 on the controller arms respectively. The movement of these terminals of members 83 is limited by slot 78, so that when the shifter arm 74 is in position to operate the low speed arm 65, the terminals 83 will be disposed in the grooved lugs 70 and 72 of the high speed and reverse controller arms respectively, and when the arm 74 is in position to shift the high speed controller arm, one terminal 83 will be disposed in the grooved lugs 71 and 72 of the low speed and reverse controller arms respectively, thus locking them against adjustment whilst the high speed gearing is operative. When the shifter arm 74 is in position to operate the reverse controller arm 67, one of the terminals 83 will be disposed in position to lock both the controller arms 71 and 70. The double arm 82 straddles the hub of arm 74 on shaft 75 so that longitudinal movement of shaft 74 will correspondingly shift the double arm 82. A pin 85 is pressed inwardly by a spring 86 in a bolt 87 (Fig. 5ᶠ) which is extended through the top of the housing $a^{11}$ to yieldingly position the double locking arm 82 in its central position, so the operator will feel when the arm 74 is neutral position, the hub of arm 82 being provided with a groove 88 for that purpose. This controlling mechanism for variable speed and reversible transmission gearing exemplifies a construction in which each of the controller arms is positively controlled by a single controlling arm and in which the controller-arms in normal position are locked against accidental movement whilst one of them is in position to render the transmission gearing operative.

Figure 1:
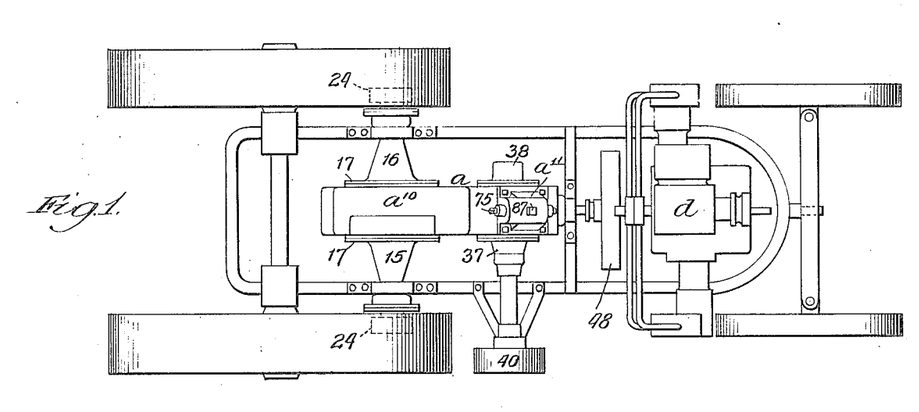
Fig. 1 is a plan illustrating the invention applied to a tractor in which the motor has an end-connection with the transmission.
Figure 1A:
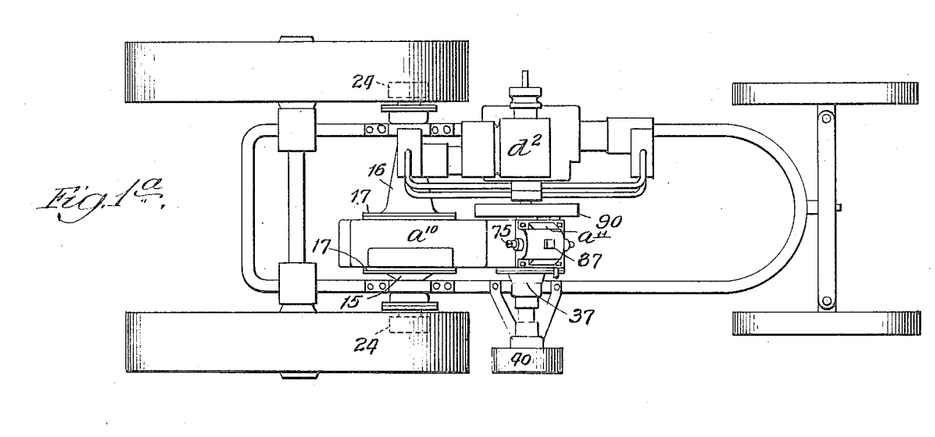
Figures 2, 2A:
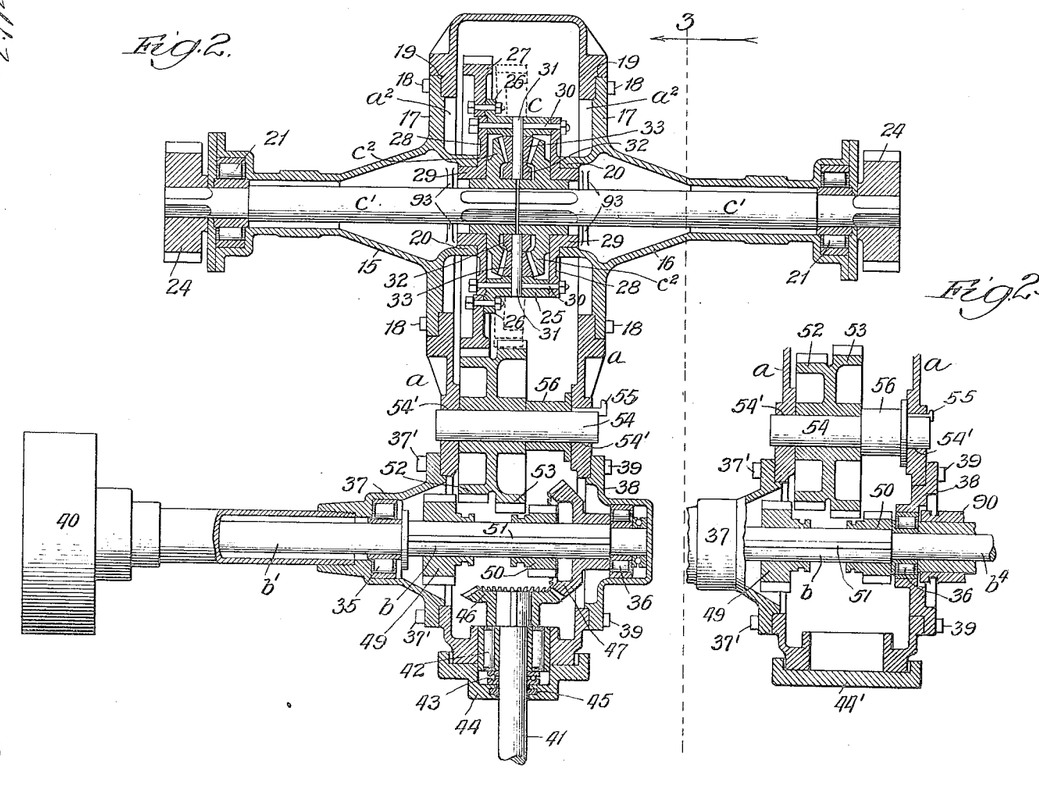
Fig. 2 is a horizontal axial section of the transmission gearing with an end connection for the motor.
Figure 4:
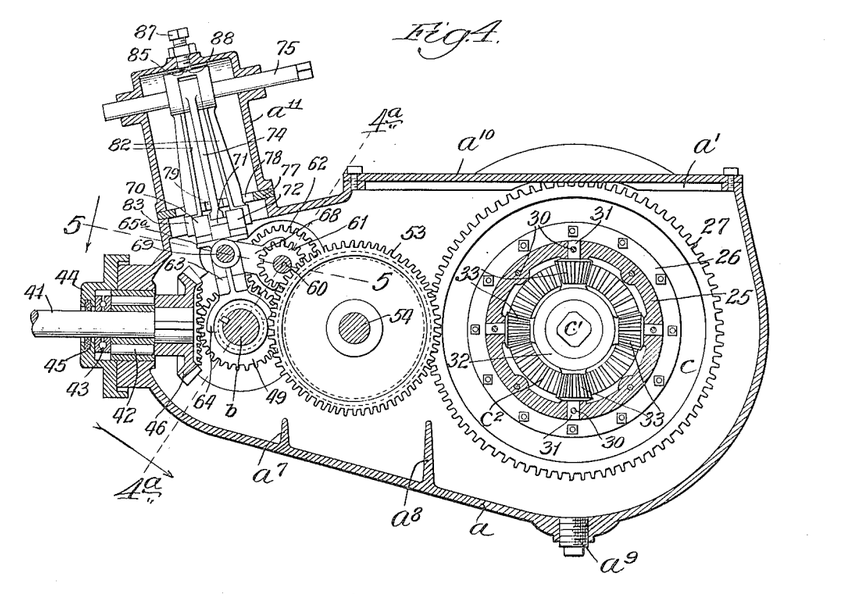
Fig. 4 is a vertical section of the gearing shown in Fig. 2.
Figure 4A:
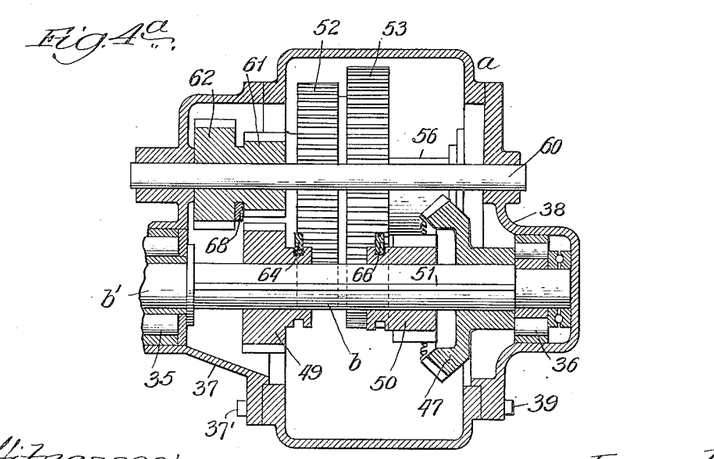

In Figs. 2 and 4, the transmission gearing is shown with an end connection to the motor, as exemplified in Fig. 1, in which the motor $d$ has its crank-shaft extended longitudinally of the tractor frame and connected to operate shaft 41 through a clutch 48. In Figs. 1ᵃ and 2ᵃ, there is shown a modification showing a side connection to the motor $d^2$ which has its shaft extending transversely of the tractor-frame. In the latter form of the invention, the shaft $b$ is provided with an extension $b^4$ which extends through one side of the case $a$ and to this extension is connected a clutch member 90 driven by motor $d^2$ and coaxial with the shaft $b$. The end of the case in the Fig. 1ᵃ construction is closed, because no end connection is used and the transmission gearing operated by a shaft $b$ is the same in construction and operation as that shown in the Fig. 1 construction.

Figures 5, 5A, 5B, 5C, 5D, 5E, 5F:
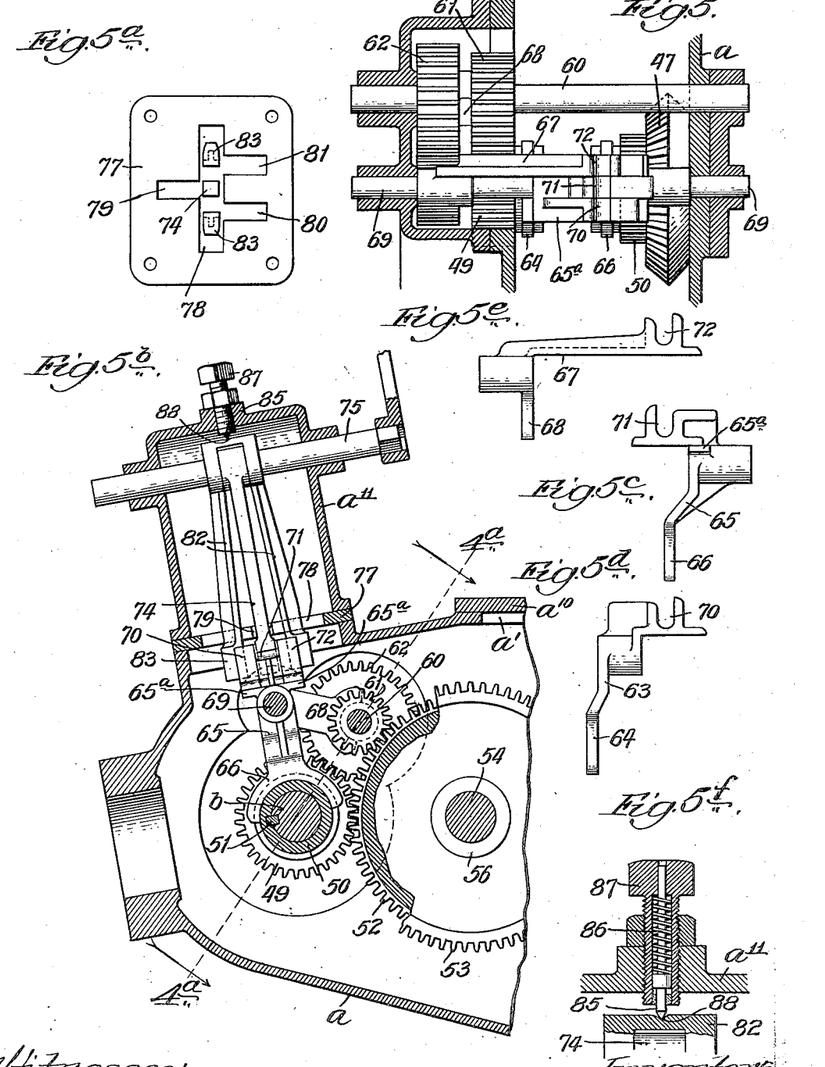
Fig. 5 is a section taken on line 5—5 of Fig. 4.

The operation of the gearing will be as follows: Assuming the controller shaft 75 to be in normal position, and the gearing neutral, the grooved lugs of the controller arms will be aligned as shown in Fig. 5, and shaft $b$ will be operated from the motor. For low speed operation, shaft 75 will be rocked so that its lower end will pass into slot 79 to operate controller arm 65 and fork 66 which will shift the revolving low speed pinion 50 into mesh with intermediate gear 53 whereupon said gear and its integral gear 52 will be operated at low speed to drive gear-ring 27 and the differential gearing at a corresponding speed. For high speed, arm 74 will be shifted back to neutral position shown in Fig. 5 to disconnect the low speed pinion 50 from gear 53 and then shaft 75 will be moved longitudinally to bring arm 74 into position to pass into slot 80 and then shaft 75 will be rocked to cause arm 74 to shift controller arm 63 with its fork 64 to cause high speed pinion 49 to mesh with the gear wheel 52. Thereupon, the differential gearing will be driven at high speed. To reverse the direction of travel of the tractor shaft 75 will be shifted longitudinally and rocked if necessary to release the controllers or to bring arm 74 into the cross slot 79 and into position to pass into the slot 81. Shaft 75 will then be rocked, moving in said slot and operating the reverse controller arm 67 into position to initially bring gear 62 into engagement with high speed pinion 49 and to then bring pinion 61 into engagement with the gear 52. Thereupon, the direction of rotation of the intermediate gears 52 and the differential gearing will be reversed and the latter will be operated at a slow reverse speed. When either of the controller arms is in position to render one of the drive pinions operative, the others will be locked against shift by the mechanism set forth.

Each sleeve 15, 16 is provided with a pocket 90' above its bearing 20 to catch lubricant splashed into it by the gearing in the rear end of case $a$ and a hole 91 in the bottom of the pocket conducts such lubricant into the chamber in sleeve between bearings 20 and 21. The vibration of the tractor causes the lubricant in this chamber to be splashed into a pocket 92 formed by a wall 93 adjacent the outer end of bearing 20 to keep said bearing well lubricated.

Figures 6, 6A:
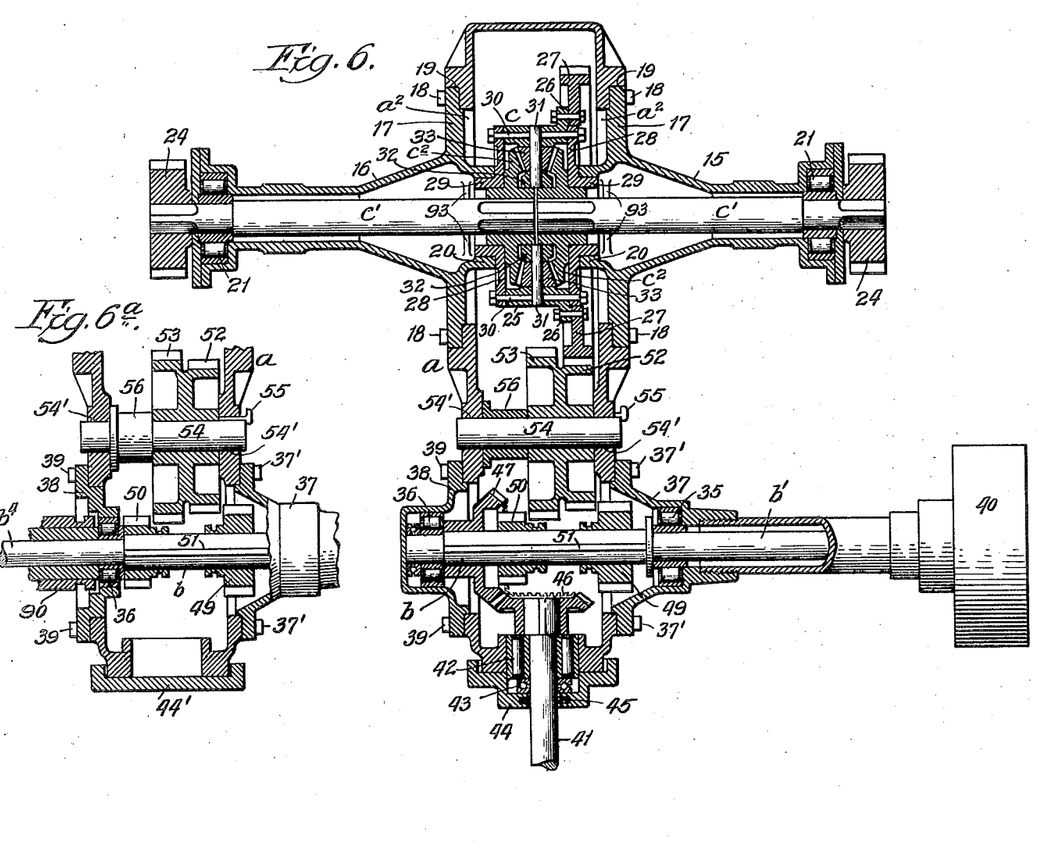
Fig. 6 is a section showing the gearing with an end-connection for the motor reversed in the case to drive the differential shafts in the opposite direction to that resulting in the gearing shown in Fig. 2.

In Fig. 6, the gearing with an end connection for a motor is shown reversed in the case to cause the high and low speed pinions to drive the driven shafts $c'$ in reverse direction from that resulting in Fig. 2, assuming the drive-shaft $b$ to be driven in the same direction by the motor. It will be understood that the openings in the sides of case $a$ which are closed by heads 37, 38 are alike so that either of said heads may be secured to either side of the case and that the heads are reversible for this purpose. As a result of reversing shaft $b$ to the left side of the case and interchanging the heads in which the shaft is mounted, gear 47 will be driven in the opposite direction from that in which it is driven when it is disposed at the right hand side. This reversal will include transposition of all of the pinions 49, 50, reverse gears 61, 62, intermediate gears 52, 53 and the differential gearing so that the operation, except for reversal in direction, will be the same as when the parts are assembled as shown in Fig. 2. This reversibility of the gearing adapts it for use to drive internally or externally toothed gears on the traction wheels. In this reverse assembly for this purpose the high and low speed controller arms 63, 65 and shaft 69 will be reversed and be operative. The reverse controller arm 74 is not, however, reversibly operative and therefore another arm with reversely extending arm will be substituted.

In Fig. 6ᵃ the gearing is illustrated for a side connection to a motor at the right hand side of the tractor, the shaft b, gearing and heads 37, 38 being reversed from the position shown in Fig. 2ª.

When the gearing is used for a side-connection, the opening for bearing 42 will be closed by a cap 44' (Figs. 2ª and 6ª).

By arranging the intermediate gears 52, 53 between the drive shaft and the differential gearing, the drive shaft will be disposed to clear the adjacent traction wheel.

In some instances, the case a is located in off-center relation on the tractor frame, as illustrated in Fig. 1ª, which necessitates the use of long and short sleeves 15 and 16 and correspondingly short and long shafts c'. To adapt the gearing for disposition on either side of the frame, the sleeves are formed so they may be reversed to bring the short shaft and sleeve on either side of the case.

Figures 7, 7A, 7B:
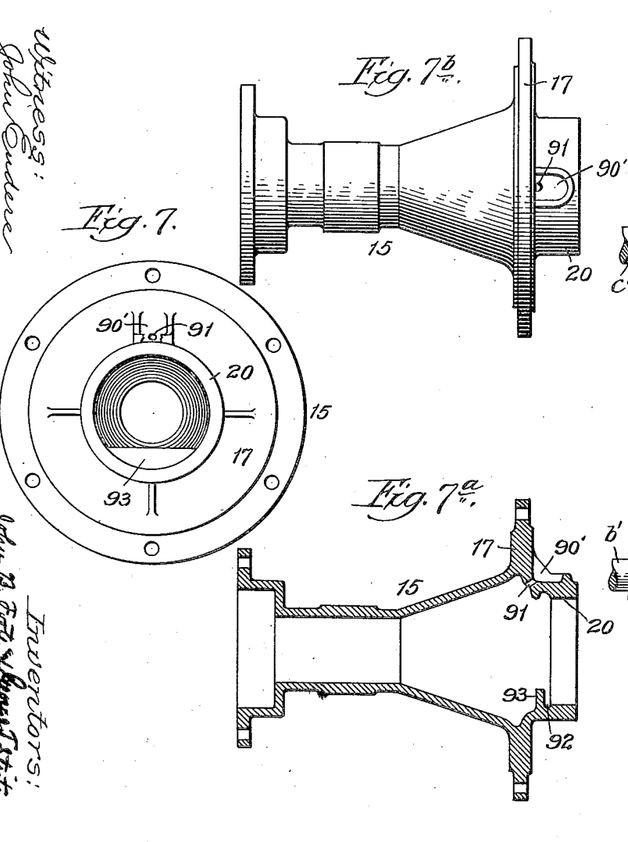
Fig. 7 is an inner end view of one of the sleeves for the differential shafts.
Figure 7C:
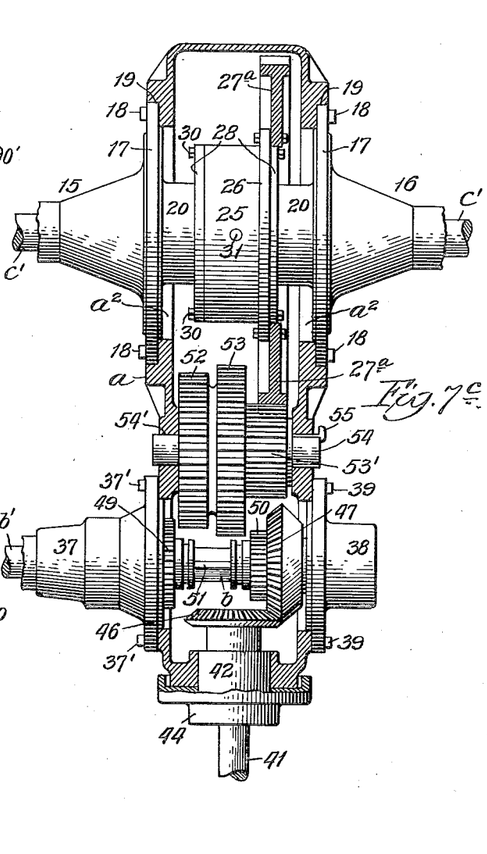

Fig. 7ᶜ illustrates a form of the invention in which greater speed reduction is attained than that possible with a pair of intermediate gears 52, 53, and for this purpose an additional gear 53' is fixed to or made integral with gears 52 and 53 and a large gear-ring 27ª is fixed to the differential gear-drum 25.

The invention exemplifies a combined transmission and differential gearing which is simple in construction, permits of variation in the ratio of speed between the drive shaft and the driven shafts without material reconstruction or reorganization and mainly by substitution of gears of different sizes. The invention is susceptible of modification for a side connection or an end connection to the motor and the gearing is reversible in the case to adapt it to drive the driven shafts in different directions. The controlling mechanism is positive and all of the transmission gearing except the drive pinions are idle when the gearing is neutral.

The invention is not to be understood as restricted to the details set forth, since these may be modified within the scope of the appended claims, without departing from the spirit and scope of the invention.

Having thus described the invention, what we claim as new and desire to secure by Letters Patent, is:

1. In variable speed transmission gearing for tractors, the combination of a case, a drive shaft mounted adjacent one end of the case, a plurality of pinions separately slidable on the shaft, a driven shaft mounted adjacent the other end of the case, a gear for driving the latter shaft, a plurality of co-axial gears mounted in the case between the drive shaft and the driven shaft, one of which meshes with said gear for driving the driven shaft, and mechanism for separately shifting either of the pinions into engagement with one of the intermediate gears respectively.

2. In variable speed transmission gearing for tractors, the combination of a case, a drive shaft mounted adjacent one end of the case, a plurality of pinions separately slidable on the shaft, a driven shaft mounted adjacent the other end of the case, a gear ring for driving the latter shaft, and a plurality of intermediate gears mounted in the case, means whereby a gear-ring for driving the driven shaft may be mounted for engagement with either of said intermediate gears, and mechanism for separately shifting the pinions into engagement with the intermediate gears, respectively.

3. In variable speed transmission gearing for tractors, the combination of a case, a drive shaft mounted adjacent one end of the case, a plurality of pinions separately slidable on the shaft, a driven shaft mounted adjacent the other end of the case, a gear for driving the latter shaft, a plurality of integral gears mounted in the case between the said shafts, one of which meshes with said gear for the driven shaft, and mechanism for separately shifting either of the pinions into engagement with one of the intermediate gears respectively.

4. In variable speed transmission gearing for tractors, the combination of a case, a drive shaft mounted adjacent one end of the case, a plurality of pinions separately slidable on the drive shaft, a driven shaft mounted in and adjacent the other end of the case, a gear for driving the latter shaft, and a plurality of intermediate gears mounted in the case, one of which meshes with said gear for the driven shaft, mechanism for separately shifting said pinions into engagement with the intermediate gears respectively, slidable reversing gears and means for shifting the reversing gears to mesh with one of the intermediate gears and one of the pinions respectively.

5. In variable speed transmission gearing for tractors, the combination of a case, a drive shaft mounted adjacent one end of the case, a plurality of pinions separately slidable on the drive shaft, a driven shaft mounted in and adjacent the other end of the case, a gear for driving the latter shaft, and a plurality of intermediate gears mounted in the case, one of which meshes with said gear for the driven shaft, mechanism for separately shifting said pinions into engagement with the intermediate gears respectively, slidable integral reversing-gears of different diameters and means for shifting the reversing gears to mesh with one of the intermediate gears and one of the pinions respectively.

6. In variable speed transmission gearing for tractors, the combination of a case, a drive shaft mounted adjacent one end of the case, high and low speed pinions separately slidable on the drive shaft, a driven shaft mounted in and adjacent the other end of the case, a gear for driving the driven shaft, and a plurality of intermediate gears mounted in the case, one of which meshes with said gear for the driven shaft, mechanism for separately shifting the high and low speed pinions into engagement with the intermediate gears respectively, slidable reversing gears one of which is smaller than the other and is adapted to move past one of the slidable pinions on the drive shaft without engaging the same, and means for shifting the reversing gears to mesh with one of the intermediate gears and one of the pinions respectively.

7. In variable speed transmission gearing for tractors, the combination of a case, a drive shaft mounted adjacent one end of the case, a plurality of pinions separately slidable on the drive shaft, a driven shaft mounted in and adjacent the other end of the case, a gear for driving the latter shaft, and a plurality of intermediate gears mounted in the case, one of which meshes with said gear for the driven shaft, mechanism for separately shifting the pinions into engagement with the intermediate gears respectively, reversing gears slidably mounted on the case and means for shifting the reversing gears to successively mesh with one of the pinions and one of the intermediate gears to cause the reversing gears to rotate before one of them engages the intermediate gear.

8. In variable speed transmission gearing for tractors, the combination of a case, a drive shaft mounted in and adjacent one end of the case, a driven shaft mounted adjacent the other end of the case, a gear for driving the driven shaft, a stud shaft mounted in the sides of the case and between the driven shaft and the drive shaft, intermediate gears on said stud shaft, one of which meshes with said gear for the driven shaft, pinions on the drive shaft for engaging the intermediate gears respectively to drive the driven shaft at different speeds, and mechanism for separately shifting the pinions on the drive shaft.

9. In variable speed transmission gearing for tractors, the combination of a case, a drive shaft mounted in and adjacent one end of the case, a driven shaft mounted adjacent the other end of the case, a gear for driving the driven shaft, a stud shaft mounted in the sides of the case and between the driven shaft and the drive shaft, intermediate gears on said stud shaft, one of which meshes with said gear for the driven shaft, pinions on the drive shaft for engaging the intermediate gears respectively to drive the driven shaft at different speeds, slidable reversing gears for meshing with one of the intermediate gears and one of the pinions respectively, and mechanism for separately shifting the pinions on the drive shaft.

10. In variable speed transmission gearing for tractors, the combination of a case, a drive shaft mounted in and adjacent one end of the case, a driven shaft mounted adjacent the other end of the case, a gear for driving the driven shaft, a stud shaft fixed in the sides of the case and between the driven shaft and the drive shaft, intermediate gears rotatable on said stud shaft, one of which meshes with said gear for the driven shaft, pinions on the drive shaft for engaging the intermediate gears respectively to drive the driven shaft at different speeds, and mechanism for separately shifting the pinions on the drive shaft.

11. In transmission gearing for tractors, the combination of differential gearing comprising a drum and pinions carried by the drum, a plurality of interchangeable gear rings having different diameters adapted to be connected one at a time to said drum, a drive shaft, intermediate gears corresponding in number to the said gear rings and each adapted to mesh with its respective ring, and connections between the drive shaft and the intermediate gears.

12. In transmission gearing for tractors, the combination of a case, differential gearing mounted in the case adjacent one end thereof and comprising a drum and pinions carried by the drum, a gear-ring on and separably connected to the drum, a drive shaft mounted in the case adjacent the other end thereof, a plurality of integral intermediate gears, one of which meshes with said gear ring, and pinions for driving the intermediate gears at different speeds in one direction and in reverse direction, said gear-ring being secured to the drum in a plane substantially between the outer faces of the intermediate gears so a gear-ring may be substituted to mesh with the other intermediate gear.

13. In transmission gearing for tractors, the combination of a case, differential gearing mounted in the case adjacent one end thereof and comprising a drum, pinions carried by the drum, shafts driven by said gearing, a gear ring on the drum, a drive shaft mounted in the case adjacent the other end thereof, a plurality of intermediate gears in the case, one of which meshes with said gear ring, pinions for driving said intermediate gears at different speeds in one direction and in reverse direction, and sleeves removably secured to the sides of the case in which the driven shafts are mounted, said case having an integral body and openings in its sides through which the differential drum may be inserted and removed and which are closed by the inner ends of said sleeves.

14. In transmission gearing for tractors, the combination of a case, differential gearing mounted in the case adjacent one end thereof comprising a drum and pinions carried by the drum, shafts driven by said gearing, a gear ring on the drum, a drive shaft mounted in the case adjacent the other end thereof, a plurality of intermediate gears, one of which meshes with said gear ring and pinions on the drive shaft for driving the intermediate gears at different speeds in one direction, said driven shafts, drive shaft and intermediate gears being mounted to rotate on parallel axes, one of said pinions being movable into engagement with the intermediate gear which meshes with the gear on the drum.

15. In transmission gearing for tractors, the combination of a case, differential gearing mounted in the case adjacent one end thereof and comprising a drum and pinions carried by the drum, shafts driven by said differential gearing, a gear ring on the drum, a drive shaft mounted in the case adjacent the other end thereof, a plurality of intermediate gears one of which meshes with said gear ring, pinions for driving the intermediate gears at different speeds in one direction and reverse-gears, said driven shafts, drive shaft, reverse gears, intermediate gears being mounted to rotate on parallel axes, one of said pinions being movable into engagement with the intermediate gear which meshes with the gear on the drum.

16. In variable speed transmission gearing for tractors, the combination of a case, a driven shaft carried in the case, a drive shaft mounted in the case, and variable speed gearing in the case between said shaft, and means for making either an end or side driving connection through the case and to said shaft, the side driving connection being independent of the end-driving connection.

17. In variable speed transmission gearing for tractors, the combination of a case, a driven shaft carried in the case, a drive shaft mounted in the case, and variable speed and reverse gearing in the case between said shafts, and means for making either an end or side driving connection through the case and to said shaft, the side driving connection being independent of the end-driving connection.

18. In variable speed transmission gearing for tractors, the combination of a case, a drive shaft in the case, differential gearing in one end of the case, variable speed gearing in the case between said shaft and the differential gearing, comprising a gear on said shaft, an end driving connection mounted in the case, the case having an opening in its side through which the drive shaft and gear thereon may be removed, and a removable closure for said opening provided with a bearing for said shaft.

19. In variable speed transmission gearing for tractors, the combination of a case, a drive shaft in the case, differential gearing in one end of the case, and variable speed and reverse gearing in the case between said shaft and the differential gearing, said case being provided with means adapted for making either an end or side driving connection to side drive shaft.

20. In a variable speed transmission gearing for tractors, the combination of a case, a drive shaft mounted in the case, a driven shaft mounted in the case, variable speed gearing in the case between said shafts, said gearing being reversible from one side to the other in the case, and means for driving said drive shaft, operative when the gearing is in either of its positions, and adapted to drive said shaft in the reverse direction when such reversal is made.

21. In variable speed transmission gearing for tractors, the combination of a case, a drive shaft mounted in the case, a driven shaft mounted in the case, variable speed and reverse gearing in the case between said shafts, said gearing being reversible from one side to the other in the case, and means for driving said drive shaft, operative when the gearing is in either of its positions, and adapted to drive said drive shaft in the reverse direction when such reversal is made.

22. In variable speed transmision gearing for tractors, the combination of a case, a drive shaft in the case, a differential gearing in the case, variable speed gearing between said shaft and differential gearing, said variable speed and differential gearing being reversible from one side to the other of the case, and means for driving said drive shaft, operative when the gearing is in either of its positions, and adapted to drive said drive shaft in the reverse direction when such reversal is made.

23. In variable speed transmission gearing for tractors, the combination of a case, a drive shaft in the case, a differential gearing in the case, variable speed and reverse gearing between said shaft and differential gearing, said variable speed and reverse and differential gearing being reversible from one side to the other in the case, and means for driving said drive shaft, operative when the gearing is in either of its positions, and adapted to drive said drive shaft in the reverse direction when such reversal is made.

24. In variable speed transmission gearing for tractors, the combination of a case, a drive shaft mounted in the case, a driven shaft mounted in the case, variable speed gearing in the case between said shafts, said gearing and drive shaft being reversible from one side to the other in the case, and means for driving said drive shaft, operative when the gearing is in either of its positions, and adapted to drive said drive shaft in the reverse direction when such reversal is made.

25. In variable speed transmission gearing for tractors, the combination of a case, a drive shaft in the case, a differential gearing in the case, variable speed gearing between said shaft and differential gearing, said variable speed and differential gearing and drive shaft being reversible from one side to the other in the case, and means for driving said drive shaft, operative when the gearing is in either of its positions, and adapted to drive said drive shaft in the reverse direction when such reversal is made.

26. In variable speed transmission gearing for tractors, the combination of a case, a drive shaft in the case, a differential gearing in the case, and variable speed gearing between said shaft and differential gearing, said variable speed and differential gearing and drive-shaft being reversible from one side to the other in the case.

27. In variable speed transmission gearing for tractors, the combination of a case, a transversely extending drive shaft in the case, a driven shaft in the case, variable speed gearing between the shafts and in the case, and bearing heads for the drive shaft reversible from one side to the other of the case, the drive shaft extending through one of the heads and to the outside of the case.

28. In variable speed transmission gearing for tractors, the combination of a case, a driven shaft carried in the case, a drive shaft mounted in the case, a high speed, a low speed and reverse pinions, gearing for driving the driven shaft from said pinions, slidable controller arms for the pinions respectively, a shaft on which all of said controller arms are mounted, a shifter arm slidably supported and movable into operative connection with any of the controller arms, and means for rocking the shifter arm to shift any of the controller arms.

29. In variable speed transmission gearing for tractors, the combination of a case, a driven shaft in the case, a drive shaft in the case, high speed, low speed and reverse pinions, gearing for driving the driven shaft from said pinions, slidable controller arms for the pinions respectively, a shifter arm slidable into operative connection with any of the controller arms, means for rocking the shifter arm to shift and for sliding it to engage any of the controller arms, and means for locking the neutral controller arms when the shifter arm is in position to operate or has shifted one of the controller arms.

30. In variable speed transmission gearing for tractors, the combination of a case, a driven shaft in the case, a drive shaft in the case, high speed, low speed and reverse pinions, gearing for driving the driven shaft from said pinions, slidable controller arms for the pinions respectively, a shifter arm slidable into operative connection with any of the controller arms, means for rocking the shifter arm to shift and for sliding it to engage any of the controller arms, and means for yieldingly holding the sliding means in one of its positions.

31. In variable speed transmission gearing for tractors, the combination of a case, a driven shaft in the case, a drive shaft in the case, high speed, low speed and reverse pinions, gearing for driving the driven shaft from said pinions, controller arms for the pinions respectively, a shifter arm slidable into operative connection with any of the controller arms, means for rocking the shifter arm to shift any of the controller arms, a slotted plate through which the shifter arm extends, and means for locking the neutral controller arms when the shifter arm is in position to operate or has shifted one of the controller arms.

32. In variable speed transmission gearing for tractors, the combination of a case, a driven shaft in the case, a drive shaft in the case, high speed, low speed and reverse pinions, gearing for driving the driven shaft from said pinions, slidable controller arms for the pinions respectively, a shifter arm slidable into operative connection with any of the controller arms, a shaft for sliding and rocking the shifter arm to shift any of the controller arms, a slotted plate through which the shifter arm extends, and a locking arm extended through said plate and into engagement with the controlling arms and pivoted on said sliding shaft for locking the neutral controller arms when the shifter arm is in position to operate or has shifted one of the controller arms.

JOHN B. FOOTE.
GEORGE T. STRITE.